Jan. 16, 1951  F. MUNGER  2,538,029
RECORDING THERMOMETER
Filed Nov. 18, 1947  2 Sheets-Sheet 1
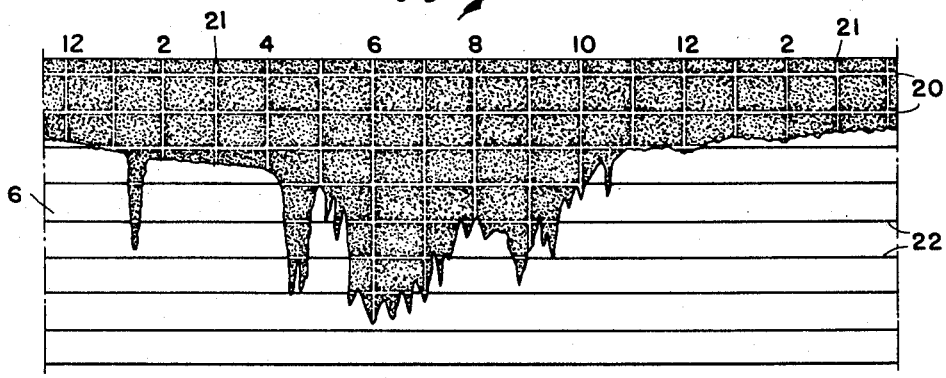
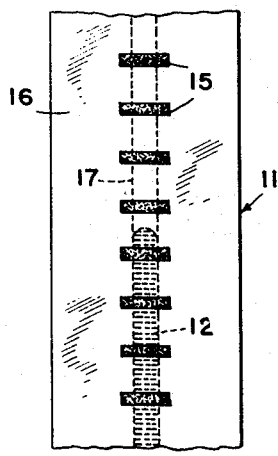 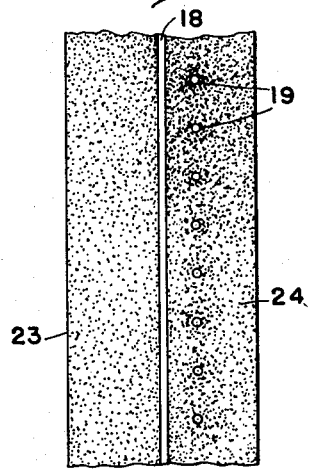 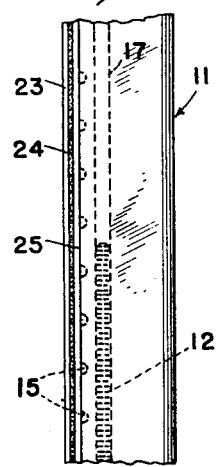
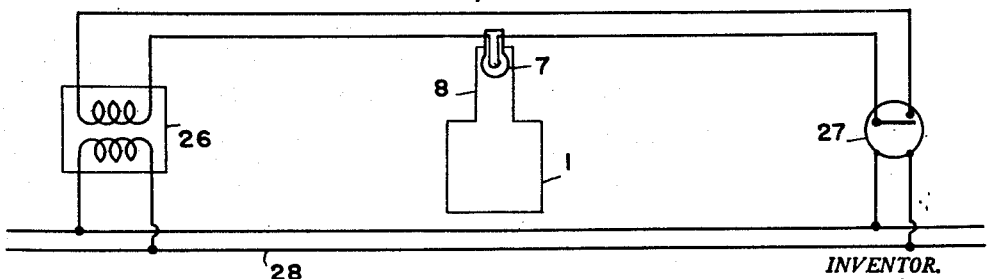
INVENTOR.
FRANCIS MUNGER Jan. 16, 1951         F. MUNGER         2,538,029
RECORDING THERMOMETER
Filed Nov. 18, 1947         2 Sheets-Sheet 2
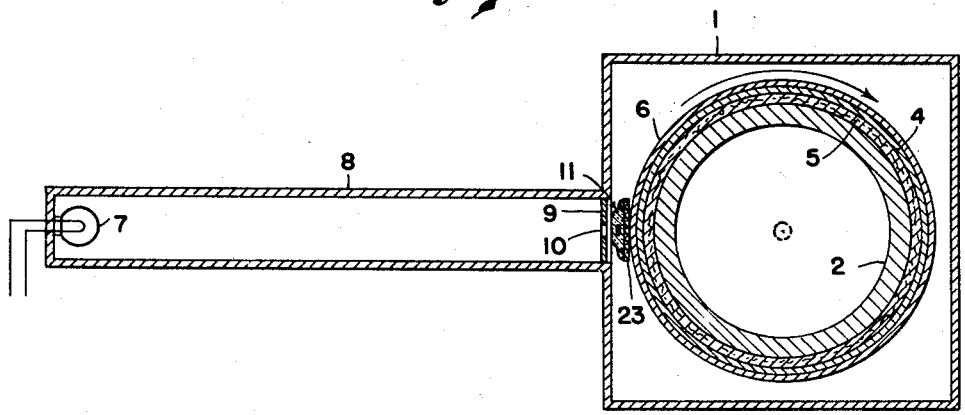
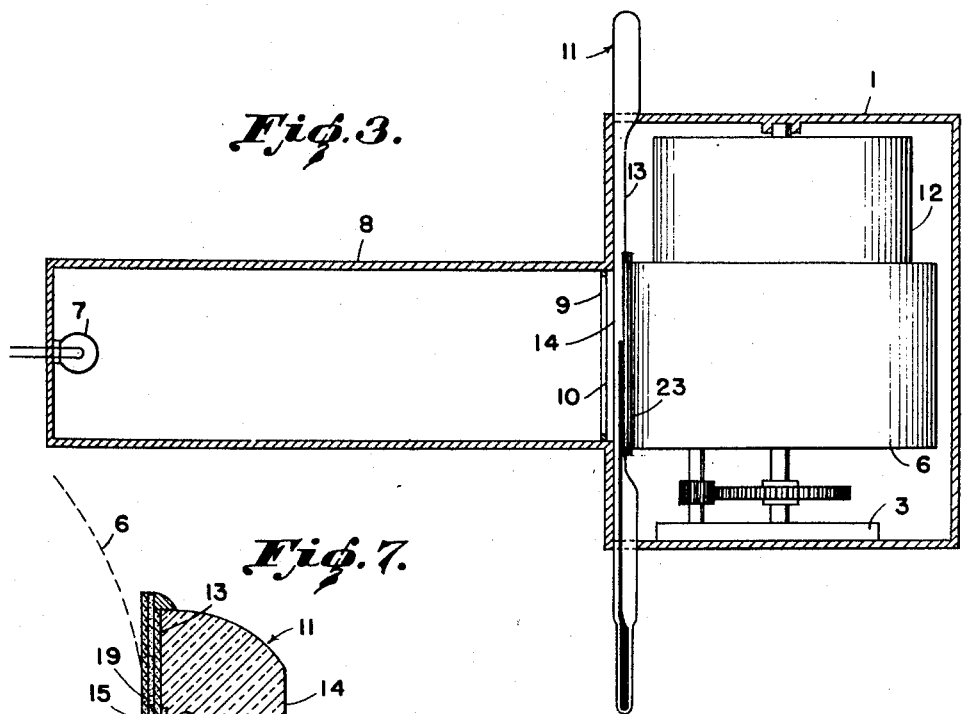
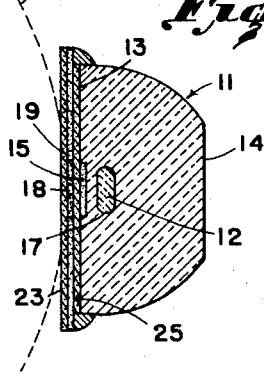
INVENTOR.
FRANCIS MUNGER Patented Jan. 16, 1951

2,538,029

UNITED STATES PATENT OFFICE 2,538,029

RECORDING THERMOMETER

Francis Munger, Whittier, Calif.; dedicated to the free use of the People in the territory of the United States Application November 18, 1947, Serial No. 786,599

2 Claims. (Cl. 346—108)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to me of any royalty thereon.

I hereby dedicate the invention herein described to the free use of the People in the territory of the United States to take effect on the granting of a patent to me.

This invention relates to a recording thermometer, for producing a continuous record of temperatures upon a strip of light-sensitized paper.

An object of this invention is an instrument which produces its own time and temperature reference lines on the sensitized paper, simultaneously with the recordation of the height of the indicating column of the thermometer. A premade chart is therefore unnecessary, thereby avoiding errors resulting from shrinking, expansion, or shifting of the chart.

A further object is the attainment of said purposes by means of an apparatus of simple and rugged construction distinguished by simplicity of operation.

One embodiment of the invention comprises directing light rays upon the mercury column of, and upon the opaque graduations of, a thermometer to form an image of the column and of the graduations upon a continuously moving light-sensitive sheet, and periodically interrupting the light rays to produce time reference lines on the sheet.

One form of this invention is illustrated in the drawings in which:

Figure 1 is an enlarged view of a portion of the temperature-time record produced by the instrument;

Figure 2 is a horizontal sectional view of the instrument;

Figure 3 is a vertical view, partly in section;

Figure 4 is a face view of the thermometer;

Figure 5 is a face view of the partially opaqued cover plate for the thermometer;

Figure 6 is a side elevation of the thermometer with the cover plate attached;

Figure 7 is a horizontal section of the thermometer and attached cover plate;

Figure 8 is a schematic diagram of the electrical connections.

The apparatus includes a light-tight housing 1, which encloses and supports a clock-driven cylinder 2 mounted on base 3. The cylinder 2 is provided with a woolen pad 5 tightly covered with a paper band 4. About the band is wrapped a strip of photographic paper 6, preferably a single weight, contrast, glossy bromide paper.

Light source 7 is mounted in one end of casing 8, the opposite end being provided with a light shield 9 having a vertical slot 10. Casing 8 is rigidly mounted on housing 1. Also rigidly mounted on housing 1 is the mercury thermometer 11, placed adjacent the slot 10.

The inside surface of the housing and casing are painted flat black to prevent light reflection, since a sharper record is obtained with a point source of light.

The thermometer may be mercury filled. As shown in Figure 7, the mercury filled capillary 17 is very close to one flattened surface of the thermometer. The opposite surface is also flattened, at 14. The thermometer graduations are etched on the flattened surface nearest the capillary, that is, on surface 13. The graduation marks are filled with opaquing pigment, shown at 15 in Figure 4. These opaque graduation marks extend across the capillary 17. They form the horizontal lines 20 in the record illustrated in Figure 1.

Fastened upon the flattened surface 13 is a thin cover glass 23. This cover glass is opaqued on one side with a suitable paint 24. When the paint is nearly dry, a fine straight line 18 is drawn lengthwise down the middle of the cover plate, with a sharp needle. The glass is then placed on the graduated side of the thermometer, with Canada balsam layer 25 between, the fine line 18 being embedded in the balsam and registering with the middle of the capillary. The embedding of the fine line protects it against collection of dirt. The glass is then fixed firmly in position, by opaque cement at the edges. The thermometer is then attached in, and to, the housing close to shield 9, the bulb projecting outside.

The clock cylinder and base are removable from the housing, through the side opposite the thermometer. The clock with the photographic paper in place is pushed toward the thermometer until the paper 6 contacts the cover glass 23. As the cylinder is rotated at constant velocity, and as the mercury rises and falls, the increments of area above the mercury level are exposed to the light. When the paper is developed the demarcation line between the upper dark and the lower light areas is the temperature record. As stated above, the opaque graduation marks at 15 produce the white horizontal temperature reference lines 20 in the dark area.

In order to provide fine horizontal temperature reference lines in the white area, windows 19 are made in the opaque coating of the cover glass, adjacent to the vertical fine transparent line 18. These windows are transparent pin points each of which is preferably aligned with an opaque graduation mark 15. The windows constitute translucent thermometer graduations. The vertical row of windows is offset to the side of the fine line 18 a sufficient distance to clear the opaque graduation marks and the mercury capillary; see Figure 7.

As the cylinder rotates the windows let light through to result in black horizontal temperature reference lines on the developed white area. Where the windows are in alignment with the opaqued thermometer graduations, the said black horizontal lines will be aligned with the white temperature reference lines. These black lines are useful in making planimeter measurements and in reading low temperatures of short duration. The diameter of the windows 19, or their vertical depth, should be less than the depth of the graduation marks 15, since the aligned windows also cause black lines within the white lines 20. Windows 19 may be omitted. The black lines within white lines 20 are omitted in Figure 1, for clarity, and because they can be made to coincide with the upper or lower edges of the white lines 20. Windows 19 need not be in alignment with the opaque marks. They may be placed midway between the marks.

The white vertical lines 21 in Figure 1 are time reference lines. These lines are produced by causing the light 7 to be turned off at pre-determined intervals by means of the time switch 27. For example, the switch is set to turn the light off automatically every hour and to remain off for a period of three minutes. The width of the white vertical line therefore would represent three minutes. The distance between vertical lines would represent one hour.

The machine therefore creates its own time and temperature reference lines on the record simultaneously with the temperature level.

Any conventional time switch can be used, and operated through a transformer 26 from power lines 28.

The apparatus described is illustrative and is capable of wide modification. For example, the opaque graduation marks may be placed on the cover glass across the fine transparent vertical line. Or, the cover glass may be dispensed with, by opaquing the flat face of the thermometer and placing the fine vertical line, the windows, and the opaque graduation marks on the flat face.

Having thus described my invention, I claim:

1. A temperature recording instrument comprising means providing a thermometer having an opaque temperature responsive indicating column and providing a translucent line parallel to and registering with said indicating column and opaque areas outside said line, the thermometer being provided with opaque graduation marks registering at least in part with the translucent line, a light sensitive chart disposed on one side of said indicating column, a light source on the other side, a timing device for shutting off the source of light at pre-determined time intervals, means for continuously moving said chart by said indicating column, whereby, upon developing the chart, a continuous record is obtained of fluctuations in height of the temperature indicating column, the record also having parallel temperature reference lines caused by the opaque graduation marks and having parallel time reference lines, transverse to the temperature reference lines, produced by the periodic shutting off of the light source, the said opaque areas being provided with a series of translucent window areas longitudinal to the translucent line but to the side of and out of registration with the thermometer temperature responsive indicating column, each translucent window area being in lateral alignment with an opaque graduation mark and being of lesser longitudinal width than the latter, whereby the record is also provided with parallel temperature reference lines in the area of the record that is traversed by the opaque indicating column, the thermometer having a face to which the temperature indicating column is closely adjacent; the opaque area, the translucent line, and the translucent window areas being mounted closely adjacent to the said face and to the opaque graduation marks.

2. In a temperature recording instrument having a thermometer, a movable light sensitive recording surface to one side of the thermometer, and a light source at the other side of the thermometer, the thermometer having an opaque temperature response indicating column and opaque temperature graduation marks: in combination therewith, a plate fixed closely adjacent to the thermometer, between the light source and the thermometer, said plate having a translucent line parallel to and registering with and closely adjacent to said indicating column and having opaque areas outside said translucent line, said opaque areas being provided with a series of translucent window areas longitudinal to the translucent line but to the side of and out of registration with the thermometer indicating column whereby the recording surface, upon developing the image, is provided with parallel temperature reference lines in the area of the record that is traversed by the opaque temperature responsive indicating column, each translucent window area being in alignment with an opaque temperature graduation mark and being of lesser longitudinal width than the latter, whereby said opaque temperature graduation marks cause said recording surface, upon development of said image, to be provided with parallel temperature reference lines in the area of the record that is not traversed by the opaque temperature responsive indicating column.

FRANCIS MUNGER.

REFERENCES CITED

The following references are of record in the file of this patent:

UNITED STATES PATENTS

| Number | Name | Date |
|---|---|---|
| 625,541 | Cole | May 23, 1899 |
| 1,068,370 | Simpson et al. | July 22, 1913 |
| 1,394,001 | Gibson | Oct. 18, 1921 |
| 1,843,442 | Brown | Feb. 2, 1932 |